Oct. 12, 1965　　W. R. GRAMS ET AL　　3,211,968
SOLION CELL COMPRISING A POROUS CATHODE ON EACH
SIDE OF THE ANODE
Filed June 28, 1961
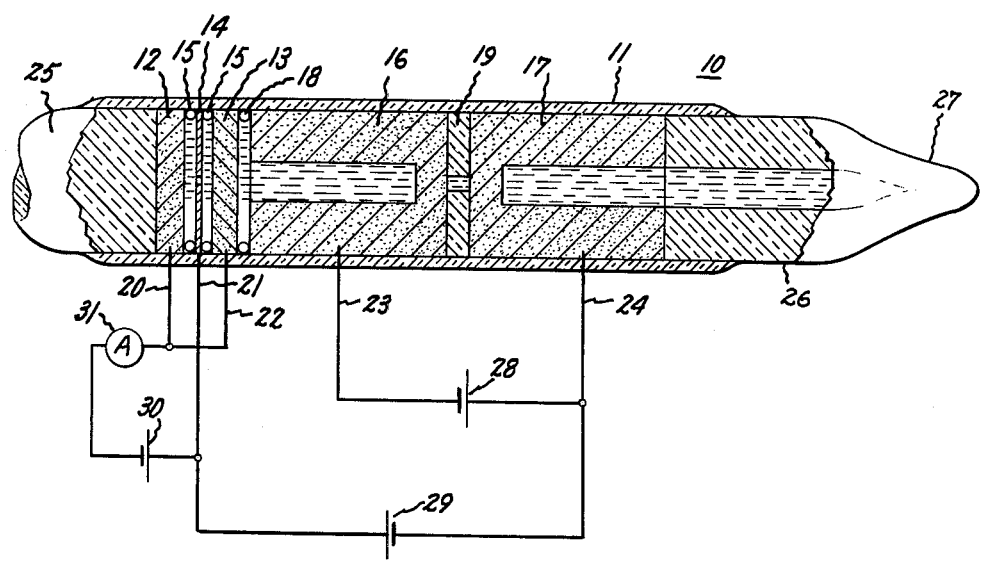
Inventors:
William R. Grams,
Joseph L. Weininger,
by James J. Lichiello
Their Attorney.

United States Patent Office 3,211,968
Patented Oct. 12, 1965

3,211,968
SOLION CELL COMPRISING A POROUS CATHODE ON EACH SIDE OF THE ANODE
William R. Grams, Ballston Spa, and Joseph L. Weininger, Scotia, N.Y., assignors to General Electric Company, a corporation of New York
Filed June 28, 1961, Ser. No. 120,239
6 Claims. (Cl. 317—231)

This invention relates to solion devices generally and particularly to solion integrators. More specifically, this invention relates to an electrode assembly in solion integrators which provides current integration.

A solion device is a precision electrochemical cell which utilizes electrodes in an electrolytic solution to accomplish oxidation and reduction of electrolyte ions at predetermined electrodes. The reaction is reversible and termed a redox system. This oxidation and reduction of ions changes the concentration of electrolyte components and is indicative of current flow therethrough. Such a solion is employed to store electrical information in the form of ions, or integrate, store, and deliver electrical signals, and is utilized to perform various functions of, for example, a diode, amplifier, multiplier, integrator, etc. The function of a solion integrator device, which provides a time integral of current passing through the device, is dependent on various features such as response time, integrating capacity, and drift. Because of critical features such as materials of construction, configuration of parts and assembly, spacings of parts, etc., which affect the solion integrator, improvements in the above features are highly desired and each contributes greatly to a more satisfactory device.

It is, therefore, an object of this invention to provide an improved solion device.

It is another object of this invention to provide an improved solion device with shorter response time.

It is yet another object of this invention to provide an improved solion device with larger integrating capacity.

It is still further object of this invention to provide an improved solion integrator employing dual cathodes in the integrator assembly.

It is another object of this invention to provide an improved solion integrator employing dual porous graphite electrodes and an intermediate impervious electrode in the integrator assembly.

Briefly described, a solion integrator of this invention includes in one form, a tubular housing adapted to contain an electrolyte solution, for example, potassium iodide and iodine. A plurality of electrodes are positioned in said housing to define separate axial chambers for the electrolyte. The integrator assembly for such a solion integrator includes a pair of spaced apart porous electrodes, as cathodes, and an intermediate impervious electrode as an anode. The pair of porous cathode electrodes are electrically connected together as one and connected into external circuitry with the other electrodes. When certain voltages are provided between the various electrodes, reduction and oxidation of iodide and iodine takes place with the integrator providing a time integral of current flowing in the system.

This invention will be better understood when taken in connection with the following description and drawing in which:

FIG. 1 is a cross-sectional and elevational view of a preferred embodiment of this invention.

Solion devices, being such precision electrochemical cells, are deleteriously affected by their materials of construction, if they are not inert with respect to the electrolyte employed. They are further affected by sealing problems, temperature expansion mismatch, and arrangement and configuration of parts.

In copending application Serial No. 120,240, William R. Grams, filed concurrently herewith and assigned to the same assignee as the present invention, there is disclosed a method of assembling a solion device utilizing Pyrex glass in conjunction with platinum and its noble metal alloys as electrodes. The application referred to is incorporated by reference herewith. More particularly, the aforementioned application describes the provision of glass and metal parts in the form of short cylinders or thick disks which are coaxially stacked and hermetically sealed under heat and pressure. By this means, a solion device is produced which minimizes mismatch effects, provides for electrical leads to be brought out of one or both ends, and finally, an improved device which may be readily plugged into an existing circuit.

The improvement provided by copending application Serial No. 120,238, William R. Grams et al., filed concurrently herewith and assigned to the same assignee as the present invention, relates to the use of porous graphite as electrodes, and electrode configurations. This referred to application is also incorporated by reference herewith. Porous graphite with the general porosity range corresponding to density of about 1.60 to 1.70 grams/cm.[3] provides a material not only inexpensive as compared to platinum, platinum alloys, and glass frit, but also a material having much more favorable expansion characteristics, for use with Pyrex and similar glasses. A most important advantage gained through the use of porous graphite is the depth of the conducting surface which minimizes the chances of an electrolyte ion passing through the electrode without being oxidized or reduced as the case may be. Furthermore, there is taught that these graphite electrodes in disk form may be effectively sealed in tubular glass housings or envelopes by being positioned concentrically in the tube and collapsing the side of the tube under heat and pressure to engage the rim of the electrode.

Referring now to FIG. 1, there is illustrated a solion device in accordance with the teachings of this invention. In FIG. 1, solion device 10, in one form, is a solion integrator and includes a Pyrex glass tube 11 adapted to contain an aqueous electrolytic solution, for example, potassium iodide and iodine, or any other suitable reduction-oxidation couple. In any exemplary application, high purity potassium iodide and iodine were employed in the ratio of 200:1 (2 N KI, 0.01 N $I_2$). The integrator portion of the solion device includes a pair of porous graphite integrator cathodes 12 and 13 about $\frac{1}{16}''$ thickness which are concentrically positioned along the longitudinal axis of tube 11 in spaced apart relationship. One preferred graphite is spectroscopically pure graphite of about 1.65 grams/cm.[3] which has been cleansed of any loose graphite particles. Positioned between and spaced from each cathode 12 and 13 is an integrator electrode anode 14, in this example platinum. Anode 14 may also be of a non-metal meeting the requirements as set forth for electrodes and other materials of construction. As one example, anode 14 comprises a 10 mil thick platinum disk having a 13 mil opening centrally thereof. The central opening, or other opening means, provides an electrolytic circuit therethrough and also filling means for the integrator. Spacing of the anode 14 from cathode 12 and 13 is assured and maintained by the use of spacers 15. Spacers 15 are of an inert material such as quartz ($SiO_2$) and preferably as fibers which may be formed as a washer, hairpin, etc. Spacings on the order of 0.001 inch are thus maintained. The material employed must be inert with respect to the electrolyte because a small volume solion device is extremely sensitive to impurities. By this dual porous cathode configuration a very large cathode surface is provided.

For a solion integrator having provision for electrical indication or readout of current integration, a pair of additional electrodes are employed. In FIG. 1, these electrodes are a separation cathode 16, and a separation anode 17 which also acts as an input cathode. Electrodes 16 and 17 are cup shaped or take the form of hollow porous graphite cylinders closed at one end and positioned concentrically in tube 11 in closed end, back to back relationship. This electrode form has been disclosed in copending application Serial No. 120,238. Use of this form or configuration permits the electrodes to define separate chambers in tube 11 for the electrolyte, and also facilitates assembly of the solion device in providing predetermined volumes. Electrodes 16 and 17 may also be a plug or disk form when certain features of the solion, in some applications, are more important such as where minimum reset time is critical. A further spacer 18 spaces separation cathode 16 about 0.015 inch from integrator cathode 13. A thick walled Pyrex cylinder 19 having a central capillary opening about 0.030 inch in diameter and about 0.062 inch in length spaces input cathode 17 from separation anode 16. These various spacings as given are not critical and are well known and derived values being subject to change depending on the final application of the solion. Integrator electrode spacings are critical insofar as maintenance of the close spacings is concerned during operation.

Electrical leads 20, 22, 21, 23 and 24 are connected to the electrodes 12, 13, 14 and 16 and 17, respectively, and brought out of tube 11. A preferred method of their connection to graphite electrodes includes drilling a small hole in graphite and melting platinum therein. Thereafter, platinum foil of about .2 to 1 mil thick is spot welded to the solidified platinum.

Assembly of a solion integrator may be accomplished in one preferred form as described in the aforementioned application Serial No. 120,238, by first assembling the parts in their positions as illustrated in FIG. 1 and thereafter providing heat and pressure to collapse tube 11 and seal all parts thereto. In one method of assembly, tube 11 is a hollow open ended tube which includes an axial slot in the wall thereof and a Pyrex rod or base 25 fitting smoothly into one end. The electrodes and spacers are then positioned in tube 11 in the arrangement as illustrated in FIG. 1. The graphite electrodes with foil and leads attached are easily placed in tube 11 with the attached foil in the slot. A chamber tube 26 is then fitted in the other end of tube 11. After positioning the electrodes and spacers in tube 11, chamber tube 26 and/or base 25 are generally adjusted or brought together so that the assembled parts fit snugly together and rigid alignment is maintained. The foil parts are then sealed to tube 11 by melting Pyrex glass in the slot about the foil parts. Thereafter base 25 and chamber tube 26 are fused or sealed to tube 11. Tube 11 is evacuated through constriction 27 and sealing of the electrodes to tube 11 is accomplished by heating tube 11 while under evacuation to collapse the tube walls to engage the periphery of the assembled parts. The assembly is thereafter filled with the electrolytic solution leaving an air space in tube 26. One advantage achieved by this arrangement is the provision of all leads in such a close position that suitable prongs may be attached thereto and the unit easily plugged into a circuit receptacle. Another advantage is the elimination of leads passing axially through the tube and the parts therein with the inherent danger of being exposed to different concentrations of electrolyte in the different chambers with resultant erroneous operation.

The solion integrator takes advantage of the fact that local concentration of iodine is changed by electrochemical reaction as current passes through the device. A simple operation of solions made in accordance with FIG. 1 is explained in conjunction with the illustrated circuitry of this figure. Referring again to FIG. 1, in order to separate iodide and iodine, electrodes 12, 13 and 16 may initially be connected to the negative side of a battery and electrode 17 to the positive side. This provides a quick separation because iodine is reduced at electrodes 12, 13 and 16 to iodide, and iodide is oxidized at electrode 17 to iodine. Another way of describing this principle is that for each iodine ion being reduced at electrodes 12, 13 and 16, an iodine ion appears at anode 17. Operation then commences with iodide ordinarily to the left of electrode 16 and iodine and iodide to the right. Electrodes are described as input and output integrator anode 14, output integrator cathodes 12 and 13, separation cathode 16, and separation anode, but input cathode 17. Basic circuitry is as follows. Cathode 16 is connected to the negative side of battery 28 and anode 17 to the positive side of battery 28. Separation of iodine takes place as described above since iodine is reduced to iodide at electrode 16 and iodine appears at anode 17. Anode 14 is connected to a suitable power source or input signal source, for the purposes of this description, to the positive side of a battery 29 and cathode to the negative side of battery 29. Iodide is then oxidized to iodine at anode 14 and iodine is reduced to iodide at cathode 17. The change of iodine concentration at anode 14 is a function of current flow according to Faraday's law. An integral of this current flow is provided by connecting the positive side of a battery 30 to anode 14 and the negative side to electrically interconnected cathodes 12 and 13 with an ammeter 31 in the line. Because free iodine concentration in the integrator chamber during the redox process, the change is indicated by the ammeter as an output current proportional to the integral value of the input current.

It is, of course, understood that the circuit as described is merely exemplary and that various modifications may take place although the process as described remains essentially the same. Input to the solion is described with relation to battery 29 as an example, since this input is ordinarily a signal from a power source generally.

Time response of this solion integrator is important in various applications. For example, in guided flight objects, a signal from an accelerometer or other such device may be of very short duration only. The solion integrator thus must have minimum time response in order to provide proper integration of these signals. Time response is affected by the porosity of the anode because of diffusion of iodine therein which requires time for separation. This invention not only reduces time response by a novel arrangement of the integrator electrodes and an impervious anode, but also preserves the remaining advantageous features derived from the use of porous graphite electrodes.

A salient feature of this invention is thus the arrangement of integrator electrodes in a solion device whereby a solid or impervious anode, for example, platinum, is positioned between a pair of porous graphite cathode electrodes to provide favorable time response, less drift, and larger integrating capacity per unit volume.

While a specific method and apparatus in accordance with this invention has been shown and described, it is not desired that the invention be limited to the particular description nor to the particular configurations illustrated, and it is intended by the appended claims to cover all modifications within the spirit and scope of this invention.

What we claim as new and desire to secure by Letters Patent of the United States is:

1. An integrator assembly for solion integrator devices comprising in combination, a sealed envelope of non-reactive material, a redox system electrolyte in said envelope, an integrator anode mounted in said envelope in contact with respective portions of said electrolyte on its opposite sides, an aperture in said anode permitting the flow of electrolyte components between said portions, and a pair of non-reactive porous cathodes, one of which is mounted on each side of said anode in contact with said electrolyte with each cathode being spaced approximately 0.001" from said anode.

2. The integrator assembly substantially as recited in claim 1 wherein the integrator anode is composed of inert platinum-containing material in the form of a disk.

3. The integrator assembly substantially as recited in claim 1 wherein the envelope is Pyrex glass.

4. A solion integrator device comprising in combination, an envelope structure containing a redox system electrolyte solution, an integrator assembly in said envelope, said integrator assembly including an impervious integrator electrode positioned in said envelope in contact with said electrolyte, said impervious electrode having means to provide an electrolyte circuit therethrough, a pair of porous graphite integrator electrodes positioned one on each side of said impervious electrode, each of said porous graphite electrodes being spaced approximately 0.001" from said impervious electrode to contain electrolyte therebetween, an additional pair of electrodes positioned in said envelope in spaced apart relationship and spaced from said porous graphite electrodes, and electrical connection means extending externally of said envelope to connect said electrodes to a source of electrical power so that oxidation and reduction of electrolyte ions takes place to provide a time integral of current flow through said device, said additional pair of electrodes adapted to provide electrical separation of the components of said electrolyte.

5. A solion integrator device comprising in combination, a tubular envelope structure containing a redox system electrolytic solution, an integrator assembly in one end of said tubular envelope, said integrator assembly comprising a pair of porous graphite integrator electrodes in spaced apart relationship, an impervious inert metal electrode coaxially positioned in said tubular envelope between said porous graphite electrodes and spaced approximately 0.001" from each of said porous graphite electrodes to define two respective portions in said electrolyte solution, said impervious electrode having opening means to provide an electrolytic circuit therethrough, an additional pair of cup shaped electrodes coaxially positioned in said tubular envelope in back to back relationship adjacent one of said pair of porous graphite electrodes and in spaced apart relationship, electrical connection means connecting said pair of porous graphite integrator electrodes together, an electrical connecting means extending externally of said tubular envelope for connection of said electrodes to a source of electrical power so that said additional cup shaped electrodes provide electrical separation of electrolyte components, and said integrator assembly provides a time integral of current flow through said solion dependent on redox process.

6. A solion integrator device comprising in combination, a tubular envelope structure containing an electrolytic solution of potassium and iodine, an integrator assembly in one end of said tubular envelope, said integrator assembly comprising a pair of porous graphite integrator electrodes in spaced apart relationship, an impervious platinum-containing electrode coaxially positioned in said tubular envelope between and spaced approximately 0.001" from each of said porous graphite integrator electrodes to contain electrolyte therebetween, said impervious platinum electrode having opening means to provide an electrolytic circuit therethrough, an additional pair of cup shaped porous graphite electrodes coaxially positioned in said tubular envelope in back to back relationship adjacent one of said pair of porous graphite electrodes and in spaced apart relationship therewith, electrical connection means connecting said pair of porous graphite integrator electrodes together, and further electrical connection means extending externally of said tubular envelope for connection to a source of electrical power so that said additional cup shaped electrodes provide electrical separation of iodide and iodine, said integrator assembly providing a time integral of current flow through said solion dependent on a redox process.

References Cited by the Examiner
UNITED STATES PATENTS

| | | | |
|---|---|---|---|
| 865,093 | 9/07 | Faria | 317—233 |
| 2,896,095 | 7/59 | Reed et al. | 317—231 X |
| 3,021,482 | 2/62 | Estes | 317—231 |

DAVID J. GALVIN, *Primary Examiner.*

JAMES D. KALLAM, *Examiner.*